United States Patent
Trim et al.

(10) Patent No.: US 11,157,811 B2
(45) Date of Patent: Oct. 26, 2021

(54) STUB IMAGE GENERATION FOR NEURAL NETWORK TRAINING

(71) Applicant: International Business Machines Corporation, Armonk, NY (US)

(72) Inventors: Craig M. Trim, Ventura, CA (US);
Gandhi Sivakumar, Bentleigh (AU);
Michael Bender, Rye Brook, NY (US);
Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/665,368

(22) Filed: Oct. 28, 2019

(65) Prior Publication Data

US 2021/0125055 A1    Apr. 29, 2021

(51) Int. Cl.
*G06N 3/08* (2006.01)
*G06N 3/04* (2006.01)
(Continued)

(52) U.S. Cl.
CPC ............. *G06N 3/08* (2013.01); *G06F 17/15* (2013.01); *G06K 9/6232* (2013.01); *G06K 9/6267* (2013.01); *G06N 3/0481* (2013.01)

(58) Field of Classification Search
CPC ...... G06N 3/08; G06N 3/0481; G06N 3/0454; G06N 3/084; G06N 3/02; G06N 3/04;
(Continued)

(56) References Cited

U.S. PATENT DOCUMENTS 9,256,807 B1    2/2016    Shlens
10,235,601 B1 *    3/2019    Wrenninge .......... G06K 9/6256
(Continued)

FOREIGN PATENT DOCUMENTS

CN     103116762 B    10/2015
CN     103984959 B    7/2017
(Continued)

OTHER PUBLICATIONS

"Fashion-MNIST", Github, Printed Aug. 15, 2019. 12 pages, <https://github.com/zalandoresearch/fashion-mnist/>.
(Continued)

*Primary Examiner* — Michael S Osinski
(74) *Attorney, Agent, or Firm* — Randy E. Tejeda

(57) ABSTRACT

In an approach to training image classification models through the creation and utilization of stub images, one or more computer processors tag ground truth data utilizing subject matter expert inputs for a classification. The one or more computer processors extract one or more features and one or more boundaries from the tagged ground truth data. The one or more computer processors tag the one or more extracted features and the one or more extracted boundaries. The one or more computer processors generate one or more stub images by incorporating the one or more tagged features, and the one or more tagged boundaries at a confidence level. The one or more computer processors train a classification model utilizing the one or more generated stub images. The one or more computer processors deploy the trained classification model.

20 Claims, 3 Drawing Sheets

(51) Int. Cl.
*G06F 17/15* (2006.01)
*G06K 9/62* (2006.01)

(58) Field of Classification Search
CPC ........ G06N 3/0445; G06N 3/10; G06F 17/15;
G06K 9/6232; G06K 9/6267; G06K
9/4628; G06K 9/00288; G06K 9/6256;
G06K 9/00281; G06K 9/00744; G06K
9/4642; G06K 9/6253; G06K 9/627;
G06K 9/00228; G06K 9/00268; G06K
9/00362; G06K 9/00671; G06K 9/00765;
G06K 9/00771; G06K 9/2054; G06K
9/3233; G06K 9/3241; G06K 9/34; G06K
9/4604; G06T 2207/20081; G06T
2207/20084; G06T 2207/10024; G06T
2207/30201; G06T 11/60
See application file for complete search history.

(56) References Cited

U.S. PATENT DOCUMENTS

| | | | | |
|---|---|---|---|---|
| 2014/0169683 | A1* | 6/2014 | Wang | G06F 16/5854 |
| | | | | 382/199 |
| 2017/0116498 | A1* | 4/2017 | Raveane | G06K 9/6257 |
| 2018/0182481 | A1* | 6/2018 | Wakasugi | G06K 9/4628 |
| 2018/0276454 | A1* | 9/2018 | Han | G06K 9/00281 |
| 2018/0373924 | A1* | 12/2018 | Yoo | G06F 21/32 |
| 2019/0065895 | A1* | 2/2019 | Wang | G06K 9/6201 |
| 2019/0073564 | A1* | 3/2019 | Saliou | G06N 3/084 |
| 2019/0130218 | A1 | 5/2019 | Albright | |
| 2019/0147227 | A1* | 5/2019 | Ko | G06K 9/22 |
| | | | | 382/118 |
| 2019/0228224 | A1* | 7/2019 | Guo | G06K 9/6274 |
| 2019/0236394 | A1* | 8/2019 | Price | G06N 3/084 |
| 2020/0117906 | A1* | 4/2020 | Lee | G06K 9/00758 |
| 2020/0118316 | A1* | 4/2020 | Kim | G06T 3/40 |
| 2020/0276853 | A1* | 9/2020 | Xu | G06K 9/00442 |
| 2020/0302177 | A1* | 9/2020 | Nguyen | G06F 17/15 |
| 2020/0349372 | A1* | 11/2020 | Lee | G06K 9/3275 |
| 2020/0364913 | A1* | 11/2020 | Bradski | G06T 7/194 |
| 2021/0042530 | A1* | 2/2021 | Kim | G06K 9/6256 |
| 2021/0049366 | A1* | 2/2021 | Horton | G06T 7/44 |
| 2021/0073590 | A1* | 3/2021 | Huang | G06K 9/6215 |
| 2021/0090248 | A1* | 3/2021 | Choi | G16H 30/20 |
| 2021/0093227 | A1* | 4/2021 | Hitaka | A61B 5/1072 |
| 2021/0158525 | A1* | 5/2021 | Iwase | G06T 7/11 |
| 2021/0201661 | A1* | 7/2021 | Al Jazaery | G06K 9/42 |

FOREIGN PATENT DOCUMENTS

| | | |
|---|---|---|
| CN | 107451661 A | 12/2017 |
| CN | 109190695 A | 1/2019 |
| CN | 109344760 A | 2/2019 |
| JP | 2005309535 A | 11/2005 |
| WO | 2018158584 A1 | 9/2018 |

OTHER PUBLICATIONS

Le, James, "The 4 Convolutional Neural Network Models That Can Classify Your Fashion Images", Oct. 6, 2018, 27 pages, <https://towardsdatascience.com/the-4-convolutional-neural-network-models-that-can-classify-your-fashion-images-9fe7f3e5399d>.

* cited by examiner

STUB IMAGE GENERATION FOR NEURAL NETWORK TRAINING

BACKGROUND

The present invention relates generally to the field of machine learning, and more particularly to image classification.

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "cat" or "not cat" and using the results to identify cats in other images. NNs accomplish this without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of multilayer perceptrons (e.g., fully connected networks), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme. CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system for training image classification models through the creation and utilization of stub images. The computer-implemented method includes one or more computer processers tagging ground truth data utilizing subject matter expert inputs for a classification. The one or more computer processors extract one or more features and one or more boundaries from the tagged ground truth data. The one or more computer processors tag the one or more extracted features and the one or more extracted boundaries. The one or more computer processors generate one or more stub images by incorporating the one or more tagged features, and the one or more tagged boundaries at a confidence level. The one or more computer processors train a classification model utilizing the one or more generated stub images. The one or more computer processors deploy the trained classification model.

DETAILED DESCRIPTION

Obtaining data sets of statistically relevant real-world data can be an impossible task due to limited available information. Traditionally, convolutional neural networks (CNNs) require substantial amounts of training data per class/label. CNN models are defined by a large number of parameters, requiring lots of data instances (e.g., images). Training convolutional neural networks on a new image set is often an impossible task due to insufficient real-world, empirical data. Models trained utilizing insignificant, low confidence training sets cannot generalize and have low classification accuracy.

Embodiments of the present invention allow for efficient training of neural networks utilized in image classification without the need for large data sets. Embodiments of the present invention recognize that model efficiency is improved by creating and utilizing high confidence images (e.g., higher values, ranks, and score represent higher confidence training images) during training. Embodiments of the present invention recognize that model efficiency is improved by extracting features and boundaries of an image and generating a plurality of stub images containing a plurality of variances and filters. Embodiments of the present invention recognize that system efficiency is enhanced by reducing the number of training sets and training statements, thus reducing the required storage. Implementation of embodiments of the invention may take a variety of forms, and exemplary implementation details are discussed subsequently with reference to the Figures.

The present invention will now be described in detail with reference to the Figures.

Figure 1:
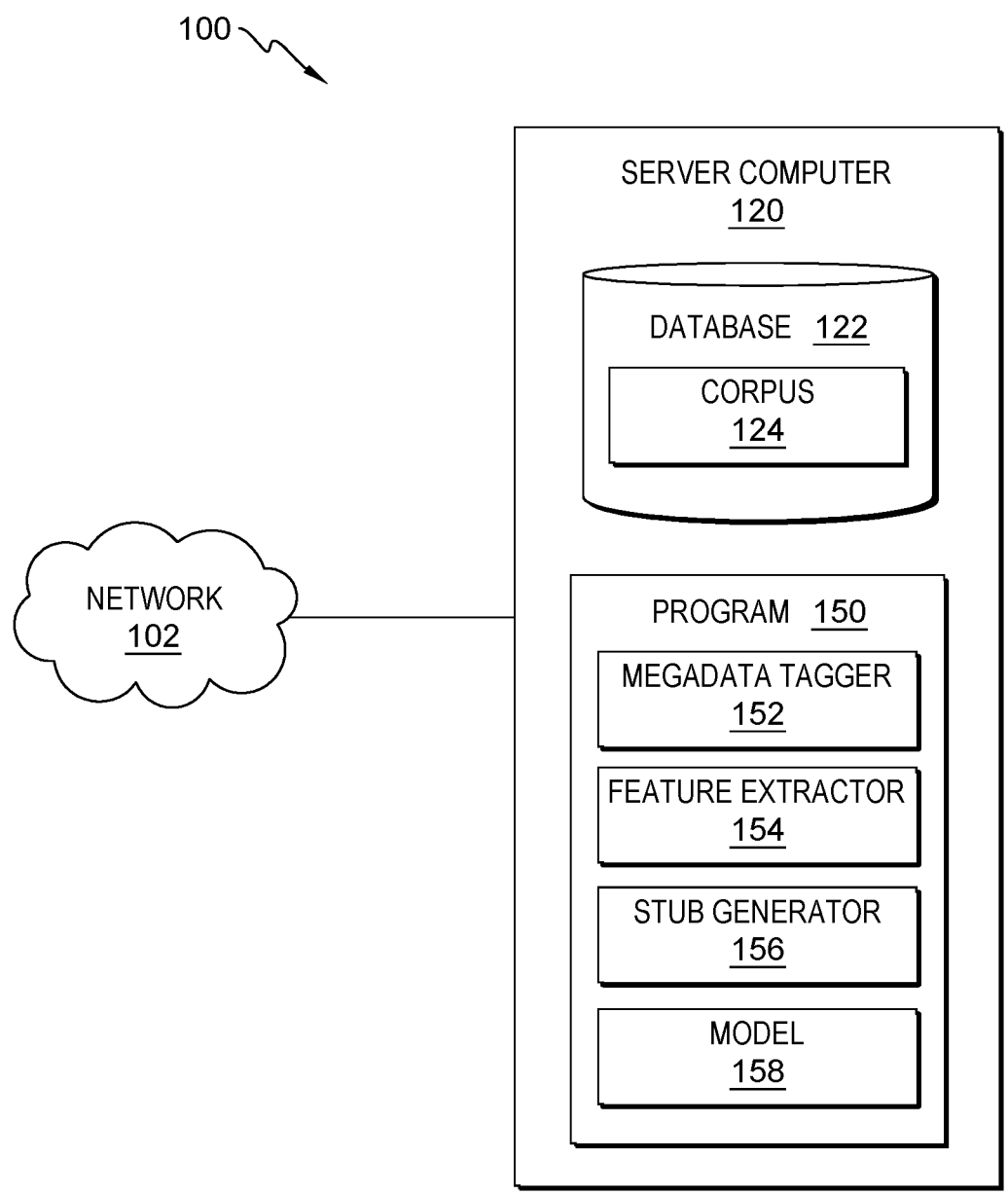
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 3.

Database 122 is a repository for data used by program 150. In the depicted embodiment, database 122 resides on server computer 120. In another embodiment, database 122 may reside on elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historically generated stub meta-images. In the depicted embodiment, database 122 contains corpus 124.

Corpus 124 contains one or more examples, sets of training data, data structures, and/or variables used to fit the parameters of a specified model. The contained data comprises of pairs of input vectors (e.g., pixel vectors) with associated output vectors (e.g., classifications, labels, etc.). In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets include labels paired with associated training statements (e.g., images, image feature vectors, stub images, etc.). In an embodiment, each training set includes a label and an associated array or set of training statements which can be utilized to train one or more models. In an embodiment, corpus 124 contains unprocessed training data. In a further embodiment, corpus 124 contains vectorized (i.e., one-hot encoding, dimension reduced, etc.) training sets, associated training statements, and labels. In an embodiment, corpus 124 stores ground truth-based image sets.

Program 150 is a program for training image classification models through the creation and utilization of stub images. For example, program 150 builds and trains a CNN for an image classification of birch trees. In this example, program 150 provides stub images in the form of a meta-image adopting multiple variances within a 90% confidence level for season, size, age, etc. The stub image is then utilized to train the CNN image classifier to recognize variances meeting or exceeding a 90% confidence threshold. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In an embodiment, program 150 contains an orchestrator subcomponent controlling a plurality of taggers, extractors, models and thresholds, as described above. In various embodiments, client versions of program 150 resides on any computing device (not depicted) within computational environment 100. In an embodiment, program 150 contains metadata tagger 152, feature extractor 154, stub generator 156, and model 158. Metadata tagger 152 accepts inputs from a subject matter expert (SME) for a given classification, for example, cat species with a minimum ground truth from the SME. Feature extractor 154 (e.g., autoencoder, multilinear subspace learning, kernel principal component analysis, convolutional neural networks, etc.) features for a given image set and tags the boundaries with the bias (e.g., fur color, eye color, etc.). Stub generator 156 creates stub images by applying confidence levels and biases on one or more data sets.

Model 158 utilizes deep learning techniques to classify images based on a plurality of features. Specifically, model 158 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In the depicted embodiment, model 158 utilizes a CNN trained utilizing generated stub images. Model 158 assesses an image by considering different features, available as structured (e.g., stub image) or unstructured data, and applying relative numerical weights. Program 150 feeds a vectorized training set of feature data to model 158. In various embodiments, the data (images) is labeled with an associated classification enabling model 158 to learn what features are correlated to a specific comment, prior to use. Model 158 learns from training sets to distinguish between likely and unlikely classifications based on an image. Once trained, model 158 can generate classifications based on the data aggregated and fed by program 150. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
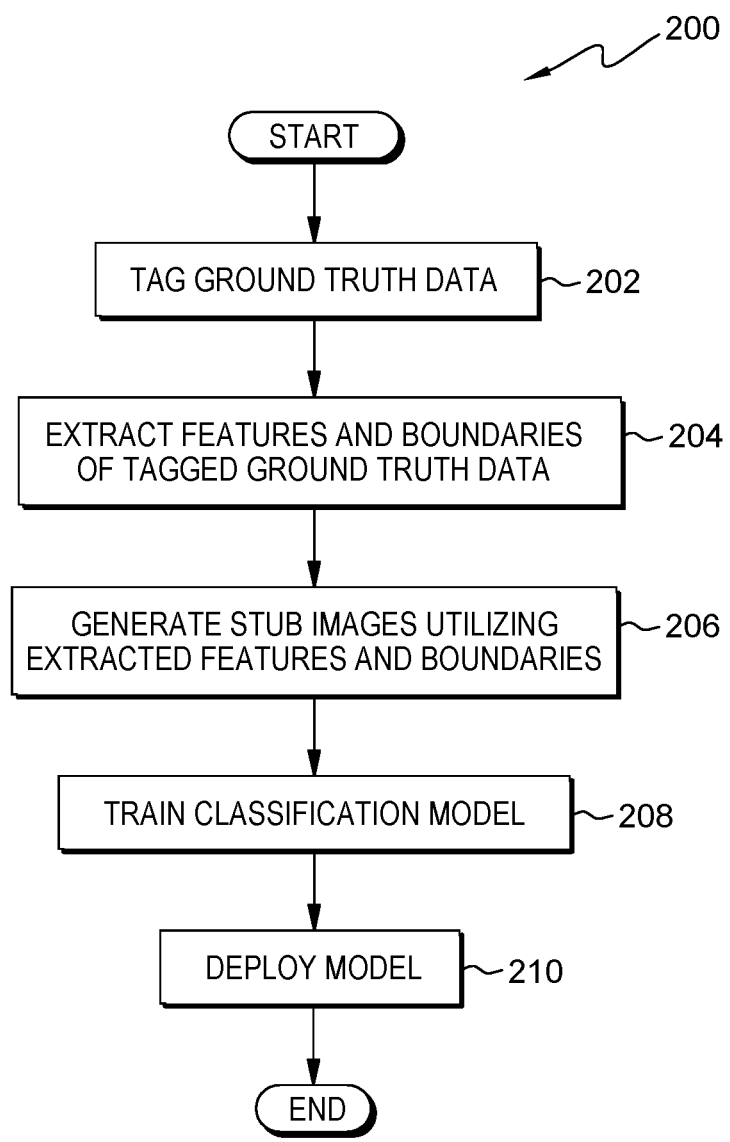
FIG. 2 is a flowchart depicting operational steps of a program, on a server computer within the computational environment of FIG. 1, for training image classification models through the creation and utilization of stub images, in accordance with an embodiment of the present invention.

FIG. 2 is a flowchart depicting operational steps of program 150 for training image classification neural networks through the creation and utilization of stub images, in accordance with an embodiment of the present invention.

Program 150 tags ground truth data (step 202). Program 150 retrieves one or more sets (e.g., training sets) of training statements. In an embodiment, said training statements may comprise images or vectors representing an image. In various embodiments, program 150 utilizes subject matter experts (SMEs) to review and create samplings (e.g., high confidence inputs, training sets, and statements) of ground truth data for pedagogical (e.g., training, classification) purposes. In said embodiments, one or more SMEs select ground truth data subset representing a diverse sampling of a given classification image. For example, an SME selects a plurality of images (e.g., photographs) of various cat species across a broad range of categories/labels (e.g., mountain cats, leopards, etc.) and associated features/values (e.g., age, appearance, weight, etc.). In another embodiment, program 150 SME output to create a small representative ground truth of images. In this embodiment, the curated training statements are high confidence representations of a classification (e.g., label). In another embodiment, the SME selected sampling of ground truth is tagged (e.g., metadata tagger 152) as metadata and associated with one or more features within one or more training sets. In various embodiments, program 150 utilizes the SME selected ground truth to extrapolate variance boundaries for specified features in an image enabling program 150 to utilizes said boundaries when training image classification models, as described in step 208.

Program 150 extracts features and boundaries of tagged ground truth data (step 204). Program 150 utilizes feature extraction (e.g., feature extractor 154) to reduce dimensionality by reducing classes for more manageable training sets. In an embodiment, feature extractor 154 starts from an initial set of measured data and builds derived values (features) intended to be informative and non-redundant, facilitating the subsequent learning and generalization steps. In this embodiment, feature extraction reduces the amount of redundant data for a given classification. In various embodiments, program 150 utilizes one or more CNNs created, designed, and trained for feature/boundary identification and extraction. In the various embodiments, program 150 utilizes a separate, pretrained, CNN for every feature type targeted for extraction. In an embodiment, image vectors are fed into one or more CNNs, allowing program 150 to derive common classifications and tag extracted features with identified boundaries. For example, for a feature set containing images of varying cats, program 150 utilizes feature extractor 154 to extract one or more features for the feature set (e.g., training set, image set), and tag feature boundaries (e.g., nose boundaries, nostril sizes, etc.) along the bias. In this example, said boundaries may include regions (e.g., pixel boundaries) that conform with an expected result such as sets of pixels expected to represent cat tails or paws. Other features in this example may include fur color, fur pattern, eye color, face profile, fur type, etc. In various embodiments, program 150 utilizes low-level feature detection where program 150 examines every pixel in an image to see if a feature is present in that pixel. In an embodiment, program 150 tags the boundaries along a bias or feature set.

In an embodiment, program 150 extracts the following features from image in a training set: edge detection, points in an image at which the image has discontinuities; corner, the intersection of two edges; interest points, points in an image which have a well-defined positions; blobs, regions in a digital image that differ in properties, such as brightness or color, compared to surrounding regions; ridges, one-dimensional curve representing an axis of symmetry, etc. In this embodiment, every feature has an associated CNN, dedicated to identifying and extracting said feature. In another embodiment, program 150 utilizes one or more basic features, described above, to identify complex shapes, patterns, boundaries, etc. For example, program 150 extracts multiple edges and blobs contained in an image of a cat to identify areas containing paws. The aforementioned CNNs output compressed vectoral representations of the extracted features.

Program 150 generates stub images utilizing extracted features and boundaries (step 206). Responsive to program 150 identifying, extracting, and tagging one or more features and boundaries associated with a training statement, program 150 generates a plurality of stub images based on tagged features and boundaries. Stub images consist of sample variations, representative of diverse image characteristics, at a specified confidence level threshold (e.g., 90%). In an embodiment, program 150 utilizes the extracted features, as described in step 204, to create (e.g., stub generator 156) a plurality of varied stub images. In an embodiment, stub images may include, but are not limited to, flattened stub images, elongated stub images, greyscale stub images, blurred stub images, sharpen stub images, denoised stub images, shifted stub images, frequency filtered stub images, convolution filtered (e.g., low pass, high pass, Laplacian, etc.) stub images, etc. In another embodiments, stub images are clustered in related feature sets. For example, program 150 clusters all the generated stub images for a feature set into a separate stub image set. In this embodiment, every model pass or stride (e.g., 5-pixel boxes) generates a varied stub image. Models utilizing stub images require significantly reduced training sets while retaining high confidence classifications. For example, instead of maintaining expansive training sets of feline paw images, program 150 utilizes a small subset of training statements and creates high confidence varied stub images.

Program 150 utilizes stub generator 156 to generate stub images for a feature set by applying confidence level and bias on feature sets. In an embodiment, program 150 creates a stub image (e.g., meta-image) for all variances of a feature set. In an embodiment, model 158 ingests a feature set with extracted features and tagged boundaries under the guidance of a threshold management module (e.g., threshold manager). In various embodiments, program 150 incorporates one or more image variations, features, and boundaries at a confidence level. In this embodiment, the threshold management module adjusts a confidence threshold controlling the requisite confidence percentage. In an embodiment, program 150 utilizes linear regression analysis for every input variation to calculate which variations are within a confidence threshold (e.g., 90% confidence) of the boundaries contained within a stub image. Images that exceeds the confidence threshold with 90% of variations are marked as matching the feature set and classified as such.

Program 150 trains a classification model (step 208). In an embodiment, program 150 trains a classification (e.g., CNN) model by identifying the correct weights for the model by multiple forward and backward iterations, while minimizing binary cross entropy (e.g., misclassification cost). Program 150 initializes model 158 with one or more weights and associated hyperparameters. In an embodiment, program 150 initializes the model with randomly generated weights. In various embodiments, program 150 utilizes weights utilized in historical or previously iterated/trained models. In this embodiment, certain features are weighted higher than others allowing the model to learn at a quicker rate with fewer computational resources. Program 150 utilizes the generated stub images to train one or more classification models. In an embodiment, program 150 utilizes the generated stub images and associated labels to train one or more classification models. In the depicted embodiment, program 150 utilizes a supervised training method to train model 158 with the generated stub images. As would be recognized by one skilled in the art, supervised training determines the difference between a prediction and a target (i.e., the error), and back-propagates the difference through the layers such that said model "learns". In another embodiment, the user may specify a training method to utilize such as unsupervised training, etc. In an embodiment, program 150 determines whether a sufficient accuracy or confidence is obtained by utilizing test sets.

Program 150 deploys the model (step 210). In various embodiments, program 150 deploys model 158 to a plurality of production environments or respective production, test, or auxiliary environments. In another embodiment, program 150 determines which deployment environment to deploy a model out of a plurality of deployment environments (e.g., test, production, backup server, containers, or virtual machines). In an embodiment, the user instructs program 150 to deploy a specific model to a specific environment. In another embodiment, program 150 utilizes the deployed model to classify one or more images. In this embodiment, program 150 compares the feature classifications in an image to the feature classification boundaries of an associated stub image. For example, responsive to processing an image of an animal, program 150 compares a classification, such as eye shape to an associated stub image to derive if the eye shape falls within an acceptable boundary of eye for a specified animal. In an embodiment, program 150, then, automatically processes the next image. Continuing from the birch tree example, responsive to program 150 analyzing (e.g., processing, inputting, etc.) an image of a diseased birch tree, program 150 compares a generated classification, such as disease type, to a stub image to derive whether a feature falls within an acceptable (e.g., threshold) boundary for a birch tree. In this example, program 150 continues to the next classification.

Figure 3:
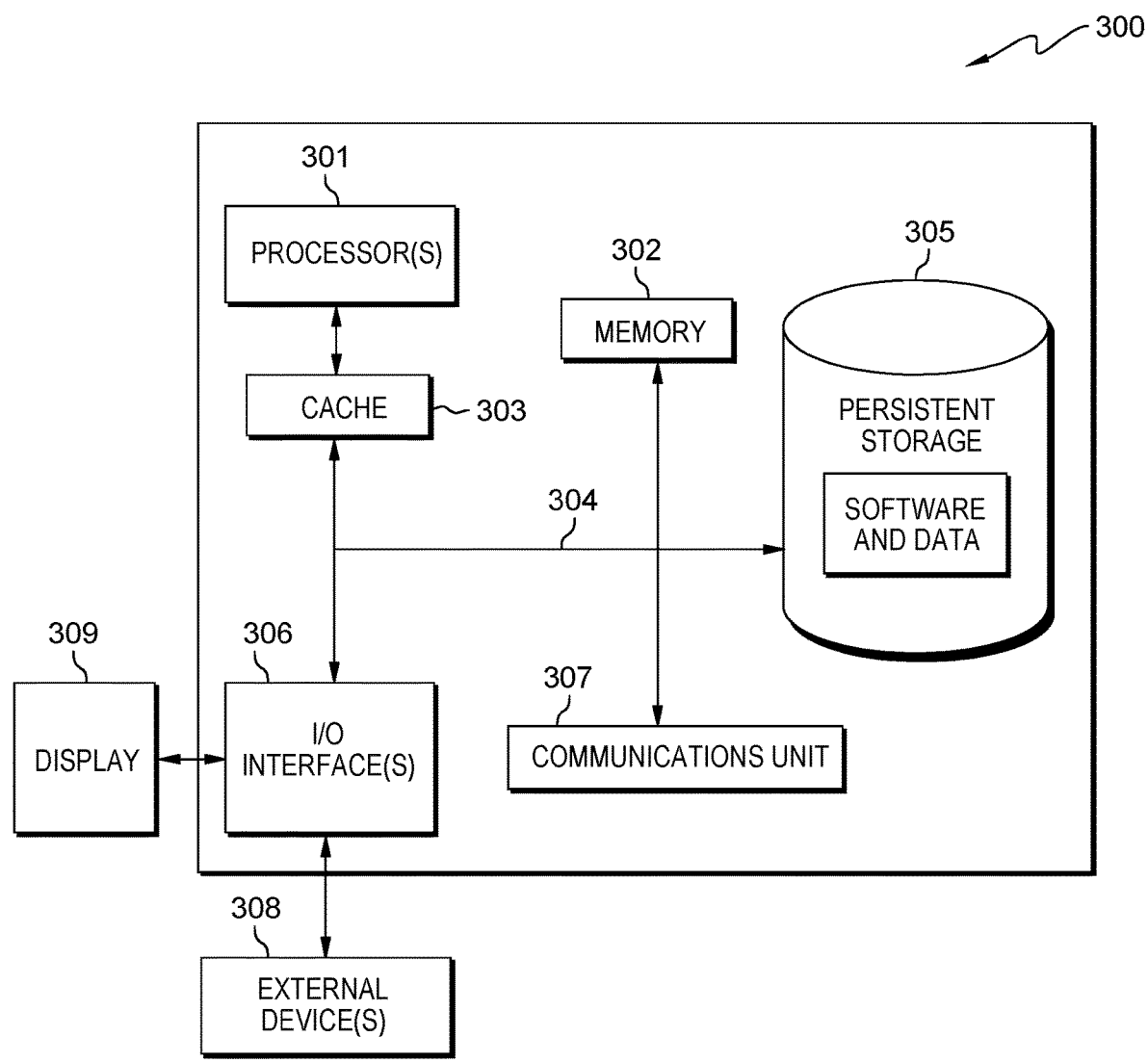
FIG. 3 is a block diagram of components of the server computer, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 401 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
tagging, by one or more computer processors, ground truth data utilizing subject matter expert inputs for a classification;
extracting, by one or more computer processors, one or more features and one or more boundaries from the tagged ground truth data;
tagging, by one or more computer processors, the one or more extracted features and the one or more extracted boundaries;
generating, by one or more computer processors, one or more stub images by incorporating the one or more tagged features, and the one or more tagged boundaries at a confidence level;
training, by one or more computer processors, a classification model utilizing the one or more generated stub images; and
deploying, by one or more computer processors, the trained classification model.

2. The method of claim 1, wherein ground truth data comprises one or more confidence training statements exceeding a 90% confidence threshold.

3. The method of claim 1, further comprising:
calculating, by one or more computer processors, a confidence level of the one or more extracted features and the one or more extracted boundaries of an image stub utilizing linear regression analysis.

4. The method of claim 1, wherein the one or more extracted boundaries include regions conforming with a feature.

5. The method of claim 1, wherein extracting one or more features and one or more boundaries from tagged ground truth data, comprises:
utilizing, by one or more computer processors, a corresponding model for a respective extracted feature or extracted boundary.

6. The method of claim 5, wherein the corresponding model is a convolutional neural network.

7. The method of claim 1, wherein the classification model is a convolutional neural network.

8. The method of claim 7, further comprising:
predicting, by one or more computer processors, a classification of an image utilizing the convolutional neural network and a stub image.

9. The method of claim 1, further comprising:
generating, by one or more computer processors, a stub image for each variance contained in a set of variances.

10. A computer program product comprising:
one or more non-transitory computer readable storage media and program instructions stored on the one or more non-transitory computer readable storage media, the stored program instructions comprising:
program instructions to tag ground truth data utilizing subject matter expert inputs for a classification;
program instructions to extract one or more features and one or more boundaries from the tagged ground truth data;
program instructions to tag the one or more extracted features and the one or more extracted boundaries;
program instructions to generate one or more stub images by incorporating the one or more tagged features, and the one or more tagged boundaries at a confidence level;
program instructions to train a classification model utilizing the one or more generated stub images; and
program instructions to deploy the trained classification model.

11. The computer program product of claim 10, wherein the program instructions stored on the one or more non-transitory computer readable storage media comprise:
program instructions to calculate a confidence level of the one or more extracted features and the one or more extracted boundaries of an image stub utilizing linear regression analysis.

12. The computer program product of claim 10, wherein the one or more extracted boundaries include regions conforming with a feature.

13. The computer program product of claim 10, wherein the classification model is a convolutional neural network.

14. The computer program product of claim 13, wherein the program instructions stored on the one or more non-transitory computer readable storage media comprise:
program instructions to predict a classification of an image utilizing the convolutional neural network and a stub image.

15. The computer program product of claim 10, wherein the program instructions stored on the one or more non-transitory computer readable storage media comprise:
program instructions to generate a stub image for each variance contained in a set of variances.

16. A computer system comprising:
one or more computer processors;
one or more non-transitory computer readable storage media; and
program instructions stored on the computer readable storage media for execution by at least one of the one or more non-transitory processors, the stored program instructions comprising:
program instructions to tag ground truth data utilizing subject matter expert inputs for a classification;
program instructions to extract one or more features and one or more boundaries from the tagged ground truth data;
program instructions to tag the one or more extracted features and the one or more extracted boundaries;

program instructions to generate one or more stub images by incorporating the one or more tagged features, and the one or more tagged boundaries at a confidence level;

program instructions to train a classification model utilizing the one or more generated stub images; and program instructions to deploy the trained classification model.

17. The computer system of claim 16, wherein the program instructions stored on the one or more non-transitory computer readable storage media comprise:

program instructions to calculate a confidence level of the one or more extracted features and the one or more extracted boundaries of an image stub utilizing linear regression analysis.

18. The computer system of claim 16, wherein the classification model is a convolutional neural network.

19. The computer system of claim 18, wherein the program instructions stored on the one or more non-transitory computer readable storage media comprise:

program instructions to predict a classification of an image utilizing the convolutional neural network and a stub image.

20. The computer system of claim 16, wherein the program instructions stored on the one or more non-transitory computer readable storage media comprise:

program instructions to generate a stub image for each variance contained in a set of variances.

* * * * *